(12) United States Patent
Kim et al.

(10) Patent No.: US 9,152,370 B2
(45) Date of Patent: Oct. 6, 2015

(54) ID SETTING SYSTEM, ID SETTING METHOD AND DISPLAY UNIT USING THE SAME

(75) Inventors: Han-Sung Kim, Hwaseong-si (KR); Dae-geun Yoon, Seoul (KR); Jeong-Ryeol Seo, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 400 days.

(21) Appl. No.: 13/116,723

(22) Filed: May 26, 2011

(65) Prior Publication Data

US 2011/0296055 A1     Dec. 1, 2011

(30) Foreign Application Priority Data

Jun. 1, 2010 (KR) .................. 10-2010-0051856

(51) Int. Cl.
    *G06G 5/00*     (2006.01)
    *G06F 3/14*     (2006.01)
    *G09G 5/00*     (2006.01)

(52) U.S. Cl.
    CPC ............ *G06F 3/1423* (2013.01); *G06F 3/1446* (2013.01); *G09G 5/006* (2013.01); *G09G 2320/08* (2013.01); *G09G 2370/042* (2013.01); *G09G 2370/045* (2013.01)

(58) Field of Classification Search
    CPC ..... G06F 3/1423; G06F 3/1446; G09G 5/006; G09G 2320/08; G09G 2370/042; G09G 2370/045
    USPC ............................................ 710/3, 8; 345/1.1
    See application file for complete search history.

(56) References Cited

U.S. PATENT DOCUMENTS

| | | | | |
|---|---|---|---|---|
| 5,175,822 A | * | 12/1992 | Dixon et al. | 710/9 |
| 5,767,818 A | * | 6/1998 | Nishida | 345/1.1 |
| 5,796,376 A | * | 8/1998 | Banks | 345/82 |
| 5,901,325 A | * | 5/1999 | Cox | 710/1 |
| 5,914,698 A | * | 6/1999 | Nicholson et al. | 345/1.3 |
| 5,986,622 A | * | 11/1999 | Ong | 345/1.1 |
| 5,987,532 A | * | 11/1999 | Tokui | 710/9 |
| 7,965,257 B2 | * | 6/2011 | Perkins et al. | 345/1.3 |
| 8,214,059 B1 | * | 7/2012 | Petrocy et al. | 700/3 |
| 2005/0062884 A1 | * | 3/2005 | Fan et al. | 348/383 |
| 2005/0132036 A1 | * | 6/2005 | Jang et al. | 709/223 |
| 2007/0109833 A1 | * | 5/2007 | Pyeon et al. | 365/63 |

FOREIGN PATENT DOCUMENTS

| | | |
|---|---|---|
| EP | 1681860 A2 | 7/2006 |
| JP | 2004-219869 A | 8/2004 |
| JP | 2004-341188 A | 12/2004 |
| KR | 10-2004-0013957 A | 2/2004 |

OTHER PUBLICATIONS

Communication dated Aug. 18, 2011 issued by the European Patent Office in counterpart European Application No. 11166988.3.

* cited by examiner

*Primary Examiner* — Eric Oberly
(74) *Attorney, Agent, or Firm* — Sughrue Mion, PLLC

(57) ABSTRACT

An ID setting method and system capable of easily setting IDs of a plurality of display units. The ID setting system includes a plurality of display units connected through an input port and an output port to each other, and a control unit that controls assignment of an ID to each of the plurality of display units. Each of the display units compares a present ID to an initial ID, and disables a connection between the output port and an another display unit when the present ID and the initial ID match. Accordingly, a user can easily assign IDs to each of the plurality of display units.

18 Claims, 17 Drawing Sheets

ID SETTING SYSTEM, ID SETTING METHOD AND DISPLAY UNIT USING THE SAME

CROSS-REFERENCE TO RELATED APPLICATIONS

This application claims priority from Korean Patent Application No. 10-2010-51856, filed Jun. 1, 2010, in the Korean Intellectual Property Office, the disclosure of which is incorporated herein by reference in its entirety.

BACKGROUND

1. Field

Apparatuses and methods consistent with exemplary embodiments relate to an identifier (ID) setting system, an ID setting method and a display unit using the same. More specifically, the present invention relates to an ID setting system capable of easily setting IDs of a plurality of display units, an ID setting method and a display unit using the same.

2. Description of the Related Art

As control technologies for display apparatuses develop, various display apparatuses, for instance, a display apparatus easily accessible in daily life, such as an information bulletin board including an advertising image and the like, to a display apparatus applied to a new art form, such as a video art, are being developed. Particularly, various visual effects may be created by using several tens or hundreds of display apparatuses.

To control a plurality of display apparatuses, a control technology is needed that is capable of separately controlling the respective display apparatuses. To implement such control, the respective display apparatuses must be identified. Conventionally, IDs were set, which were made up of letters or figures that identify the plurality of display apparatuses, and the plurality of display apparatuses have to be individually operated.

FIG. 1 is a view illustrating a conventional ID setting method. As illustrated in FIG. 1, a currently set ID 20 and an ID 30 to be changed by an input of a user are shown in an ID setting control window 10. The currently set ID 20 will be an initial ID set when a display apparatus is fabricated, and if the initial ID has not changed, the ID setting control window will display the initial ID. In FIG. 1, it is assumed that the initial ID was set to a value of '0' 25. At this time, when the user inputs a number into a number input blank 35 to change the ID of the display apparatus, the ID is set to the input number. That is, if the user inputs the value of '01' into the number input blank 35, the corresponding display apparatus is set to have an ID of '01'.

To set the IDs of the display apparatus, the user will have to individually set the IDs of each of the display apparatuses. Also, if the setting of the IDs is performed using a remote control or the like, any display apparatuses adjacent to one another may be operated together in response to a single signal generated from the remote control. Thus, to set an ID of any one of the display apparatuses, other display apparatuses should be turned off, or set not to react to the signal generated from the remote control.

In the conventional ID setting method described above, there is a problem in that, as the greater the number display apparatuses, the inconvenience of setting the IDs increases. Also, if the plurality of monitors is set to a same ID by mistake, controlling the display apparatuses becomes impossible.

SUMMARY

Exemplary embodiments overcome the above disadvantages, as well as other disadvantages not described above. Also, the exemplary embodiments are not required to overcome the disadvantages described above, and an exemplary embodiment may not overcome any of the problems described above.

One or more exemplary embodiments provide an ID setting system capable of easily setting IDs of a plurality of display units, an ID setting method, and a display unit using the same.

One or more exemplary embodiments also provide an ID setting system capable of preventing an ID from being duplicated for a plurality of display units, an ID setting method, and a display unit using the same.

According to an aspect of an exemplary embodiment, there is provided an ID setting system including a plurality of display units adjust a connecting state between each other according to whether a present ID matches a pre-stored initial ID, respectively; and a control unit that sets IDs of currently connected display units according to the connecting states of the plurality of display units.

Each of the plurality of display units includes an input port, an output port, and a control part that compares the present ID and the pre-stored initial ID with each other and enables a connection between the output port and another display unit when the present ID and the pre-stored initial ID do not match and disables the connection between when the present ID and the pre-stored initial ID match.

The control unit is connected in series with a display unit disposed at a terminal of the plurality of display units.

When a newly connected display unit is connected, the control unit generates an ID different from the IDs of previously connected display units and assigns the generated ID to the newly connected display unit.

The control unit includes an output port connected in series with one of the plurality of display units, and a control part that generates an ID different from an initial ID of the one display unit and assigns the generated ID as a present ID of the one display unit, and the control part assigns an ID different from the present ID of the one display units as a present ID to at least one subsequent display unit subsequently connected to the one display unit.

The control unit includes an output port connected in series with one of the plurality of display units a control part that generates an ID different from an initial ID of the one display unit, a display part that displays the generated ID, and an input part that receives a user select signal for selecting the displayed ID, and when the user select signal is received, the control part assigns the generated ID as a present ID of the one display unit and successively generates an ID different from the present ID of the one display unit to at least one subsequent display unit subsequently connected to the one display unit.

According to an aspect of an exemplary embodiment, there is provided an ID setting method including comparing a present ID with a pre-stored initial ID, by a first display unit among the plurality of display units, enabling a connection between the first display unit and a second display unit among the plurality of display units when the present ID and the initial ID do not match each other, and disabling the connection between the first display unit and the second display unit when the present ID and the initial ID match each other, and by the control unit, generating an ID different from the initial ID and assigning the generated ID as a present ID of the first display unit when the connection between the first display unit and the second display unit is disabled.

The method includes generating an ID different from the present ID of at least one of the first display unit and the second display unit, displaying the generated ID, receiving a user select signal for selecting the displayed ID, and assigning the generated ID as a present ID of at least one of the first display unit and the second display unit when the user select signal is inputted.

The method includes repeating the comparing, the switching, and the setting for each of the plurality of the display units other than the first display unit and the second display unit.

According to an aspect of another exemplary embodiment, there is provided a display unit including an input port that receives a signal, an output port that outputs the received signal to an external unit, and a control part that compares a present ID and an initial ID with each other and disables a connection between the output port and the external unit when the present ID and the initial ID match each other.

The control part enables a connection between the output port and the external unit when the present ID and the initial ID do not match each other.

The unit further includes a switching part that selects whether the output port and the external unit are connected with each other, and the control part controls the switching part to determine whether the output port and the external device are connected with each other.

The present ID is changed into a value different than a value of the initial ID by a control signal outputted from the control part.

The output port outputs a control signal received from the input port, to the external unit.

According to an aspect of another exemplary embodiment, there is provided an ID setting method including receiving a signal for changing an ID from an external unit, comparing a present ID changed by the received signal with an initial ID, and disabling a connection between an output port and the external unit when the present ID and the initial ID are match each other.

The method further includes enabling the connection between an output port and the external unit when the present ID and the initial ID do not match with each other.

The signal comprises at least one of a signal outputted from an external display unit and a control signal outputted from a control unit.

The control unit controls setting of an ID of the display unit.

The output port is connected with the outer external by radio or by wire.

The output port is a port through which the received signal is output to the external unit.

With the ID setting system, the ID setting method and the display unit according to the various exemplary embodiments, a user can facilitate setting IDs of a plurality of display units.

BRIEF DESCRIPTION OF THE DRAWINGS

The above and/or other aspects will become more apparent by describing certain exemplary embodiments with reference to the accompanying drawings, in which.

DETAILED DESCRIPTION OF EXEMPLARY EMBODIMENTS

Figure 1:
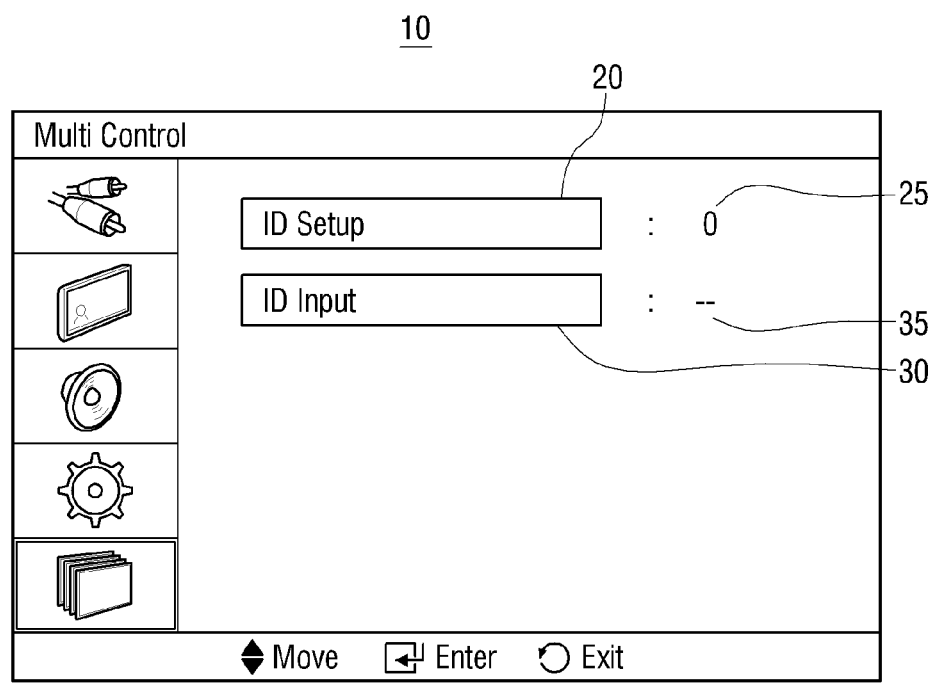
FIG. 1 is a view illustrating a conventional ID setting method.

Exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of the invention. However, the exemplary embodiments can be practiced without those specifically defined matters. Also, well-known functions or constructions are not described in detail, since they would obscure the invention with unnecessary detail.

Figure 2:
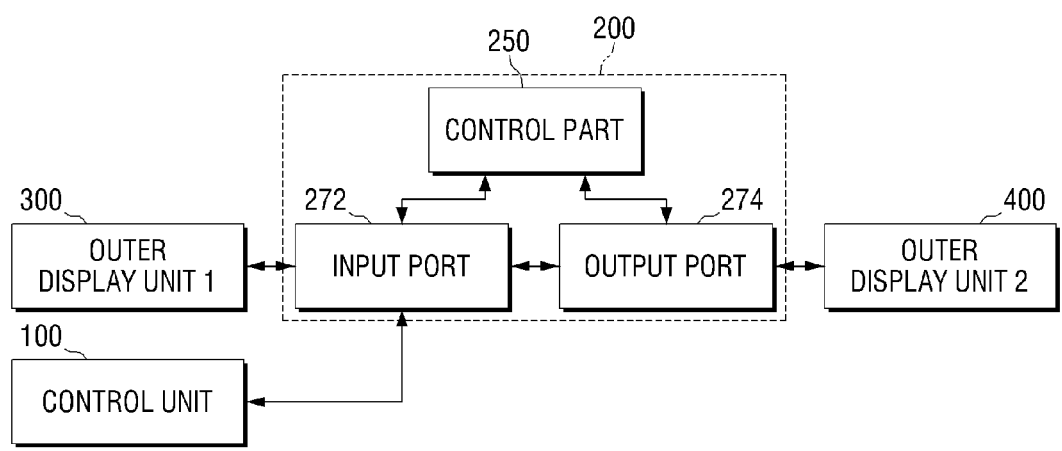
FIG. 2 is a block diagram illustrating a construction of a display unit according to an exemplary embodiment.

FIG. 2 is a block diagram illustrating a display unit according to an exemplary embodiment. The display unit 200 includes a control part 250, an input port 272, and an output port 274. The display unit 200 may be connected a control unit 100, and/or first and second outer display units 300 and 400.

The display unit 200 is preferably connected in series with the first and second outer display units 300 and 400. A connection between the control unit 100 and each of the display units 200, 300 and 400 may be a daisy chain connection, which enables the control unit 100 to communicate with the display units 200, 300 and 400, but the exemplary embodiment is not limited thereto. Also, the respective display units 200, 300, and 400 may be not connected in series by a single series connection, but may be connected by more than one series connections.

The control unit 100 functions to control the display units 200, 300 and 400 connected thereto and to set IDs of the display units 200, 300, and 400. That is, the control unit 100 may select a display unit to be controlled by using the IDs set to the respective display units. Here, the display units 200, 300, and 400 will be controlled, respectively, or divided and controlled in groups.

The input port 272 receives a signal from the control unit 100 or the first outer display unit 300. And the output port 274 functions to transmit the received signal to the second outer display unit 400 connected thereto.

On the other hand, the signal that the input port 272 receives may be a control signal outputted from the control unit 100, and a general operation of the display unit 200 may be controlled by the control signal. Moreover, the control signal may be an ID setting signal or a signal from the display units. If the control signal is the ID setting signal, an ID of the display unit 200 can be changed by the control signal.

Also, the signal that the input port 272 receives may be a signal outputted from the first outer display unit 300. That is, the signal may be a control signal outputted from another control unit (not shown) connected to the first outer display unit 300, or a signal outputted from the first outer display unit 300 itself.

The output port 274 functions to transmit the signal received from the input port 272 to the second outer display unit 400 connected thereto.

Here, the input port 272 and the output port 274 may be wirelessly connected by radio or wired with the control unit 100, the first outer display unit 300, and the second outer display unit 400. If the units are connected by wire, a communication connection, such as a recommended standard-232C (RS-232C), may be employed, but the exemplary embodiment is not limited thereto. Also, if the units are wirelessly connected by radio, a connection by using an infrared (IR) signal or a radio frequency (RF) signal may be employed.

With the above described method, the IDs of the respective display units 200, 300, and 400 may be initialized by the control unit 100. When initialized, the IDs for all of the connected display units 200, 300, and 400 may be initialized to initial values or certain values inputted by a user. Alternatively, a method in which the IDs are initialized in an order from a display unit connected most close to the control unit 100 may be used. Also, a method in which the IDs are initialized in reverse order from a display unit connected most apart from the control unit 100 may be considered.

In the above description, although the display units are explained as having certain numbers, this is only for convenience of the explanation, and the exemplary embodiment is not limited thereto.

Figure 3:
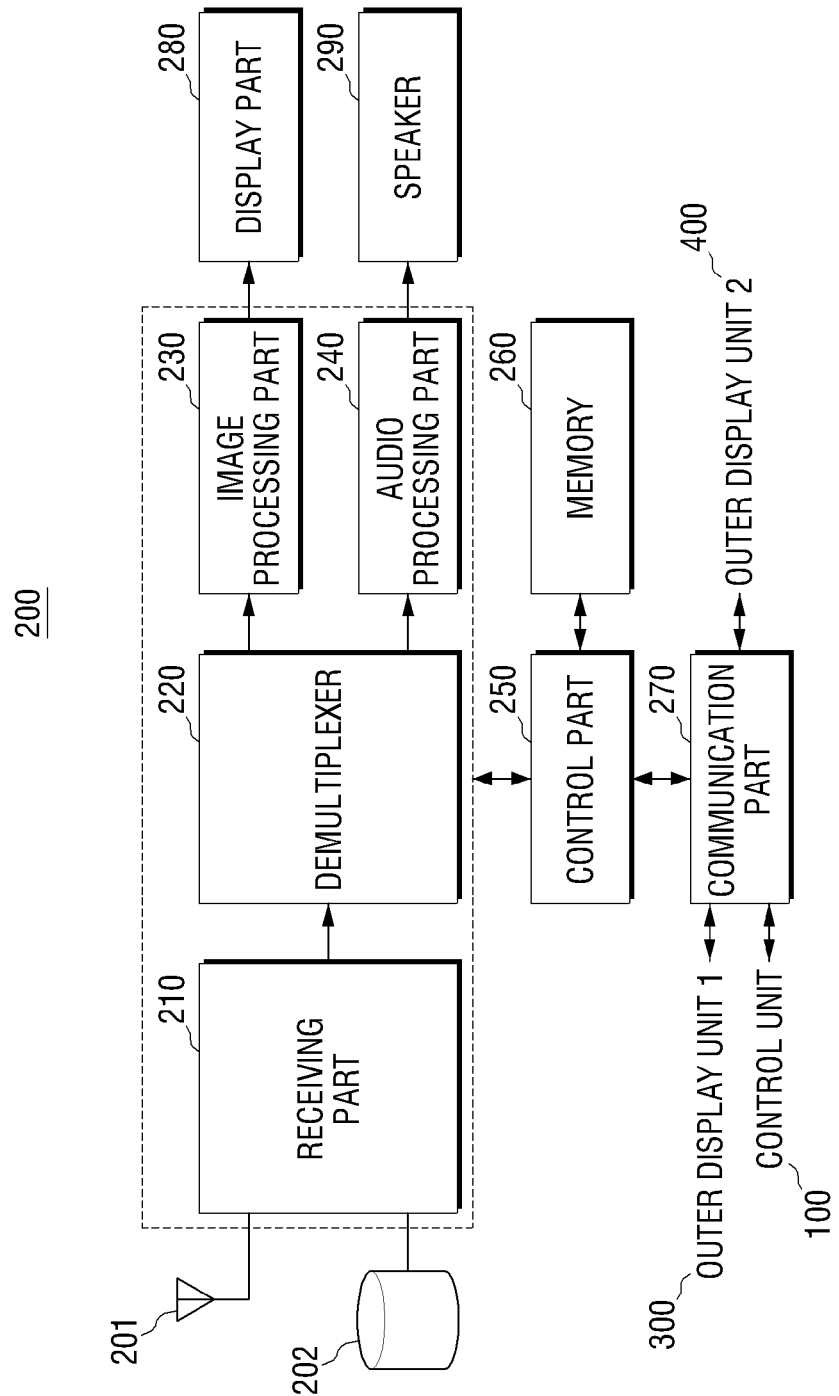
FIG. 3 is a block diagram illustrating a construction of a display unit to which an exemplary embodiment may be applied.
Figure 4:
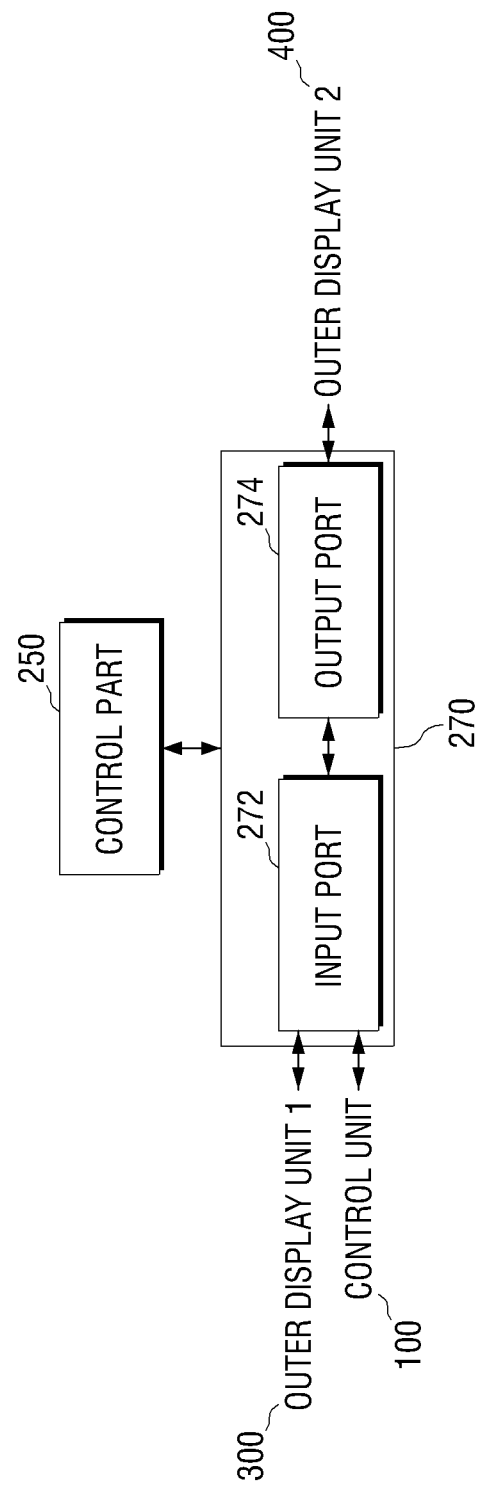
FIG. 4 is a block diagram illustrating a construction of a communication part included in the display unit according to an exemplary embodiment.

Hereinafter, a construction of a display unit, to which an exemplary embodiment may be applied, will be explained with reference to FIGS. 3 and 4, FIG. 3 is a block diagram illustrating the construction of the display unit to which the exemplary embodiment may be applied. The display unit 200 includes a receiving part 210, a demultiplexer 220, an image processing part 230, a control part 250, a memory 260, a communication part 270 and a display part 280.

The receiving part 210 receives image data through an antenna 201 or an outer storing unit 202. The antenna functions to receive image data by radio from a source, and the outer storing unit 202 is a unit capable of providing the image data, such as a PC, a DVD player, or the like.

The demultiplexer 220 functions to divide the image data received from the receiving part 210 into an image signal and an audio signal, and to output the image signal and the audio signal to the image processing part 230 and an audio processing part 240.

The image processing part 230 decodes the image signal received from the demultiplexer 220 into a format for outputting the image signal, and provides the decoded image signal to the display part 280.

The audio processing part 240 decodes the audio signal received from the demultiplexer 220 in a format for outputting the signal through a speaker 290, and provides the decoded audio signal to the speaker 290.

The control part 250 controls the receiving part 210, the demultiplexer 220, the image processing part 230 and the audio processing part 240, which are described above, to take part in a general operation of the display unit 200. Definite operations thereon will be explained in detail later.

The memory 260 stores data needed to control the display unit 200, temporarily stores the received image data, or performs a buffering function in the decoding. Also, if the display unit 200 is controlled from an external source, the memory 260 stores an initial ID for identifying the display unit 200. And if the initial ID is changed, the memory 260 may also store the changed ID.

The communication part 270 functions to transmit the signal received from an external source to another external source. Here, if connected by wire, the received signal may be transmitted through a line, and if connected by radio, the received signal may be wirelessly transmitted by an IR signal or an RF signal.

The display part 280 displays the image signal received from the image processing part 230 as an image.

The speaker 290 outputs the audio signal received from the audio processing part 240. In the exemplary embodiment, although the speaker 290 is explained as being not included in the display unit 200, the speaker 290 may be included in the display unit 200. That is, a construction in which the speaker 290, which is an outer appliance, may be connected by radio or wire to the display unit 200.

On the other hand, the display unit 200 may be connected with the outer display units 300 and 400 and the control unit 100.

The control unit 100 may operate the display unit 200 from the outside, and particularly, set an ID, which is an identification number for operating the display unit 200 from the outside. On the other hand, the control unit 100 may be connected by wire or radio with the display unit 200.

Also, the signal received from the connected first outer display unit 300 may be transmitted to the second outer display unit 400 via the communication part 270 of the display unit 200. As illustrated in FIG. 4, the communication 270 includes the input port 272 and the output port 274.

The control part 250 may compare a present ID with the initial ID stored in the memory 260, and control the communication part 270 to disable an output to the second outer display unit 400 if the present ID coincides with the initial ID. That is, the control part 250 may block the output port 274 of the communication part 270 to terminate a connection to the second outer display unit 400.

In this case, since the second outer display unit 400 is not connected with the display unit 200, the control unit 100 cannot recognize or control the second outer display unit 400.

Here, the initial ID may be an ID set when the display unit 200 is manufactured, but the ID may also be an ID set after the display unit 200 is manufactured.

If the initial ID is not changed after the display unit 200 is manufactured, the initial ID may be a present ID, and if the ID is changed to another ID by the user, the changed ID will be the present ID. The change of the ID may be carried out in response to an ID change signal generated from the control unit 100. That is, the input port 272 of the communication part 270 may receive the signal outputted from the control unit 100 to change the ID stored in the memory 260.

On the other hand, the control unit 250 may compare the present ID with the initial ID stored in the memory 260, and control the communication part 270 to allow an output to the second outer display unit 400 if the present ID does not coincide with the initial ID. That is, the control part 250 may enable a connection between the output port (not shown) of the communication part 270 and the second outer display unit 400.

In this case, since the control unit 100, the display unit 200 and the second outer display unit 400 are connected with one another, the control unit 100 may recognize or control the display unit 200 and the second outer display unit 400.

On the other hand, with respect to the ID setting, the IDs may be automatically or manually set at the control unit 100. If the IDs are automatically set, a method in which the control unit 100 generates an ID different from the IDs already assigned to other display units may be considered. In addition, it will also be possible to set IDs to the respective display units by generating the IDs in an order.

Also, if manually set, the IDs may set by an input of the user through an input part (not shown) provided in the control unit 100, or set to each of the display units through a remote controller. The methods are not limited to any one thereof, and may be embodied in various forms.

Figure 5:
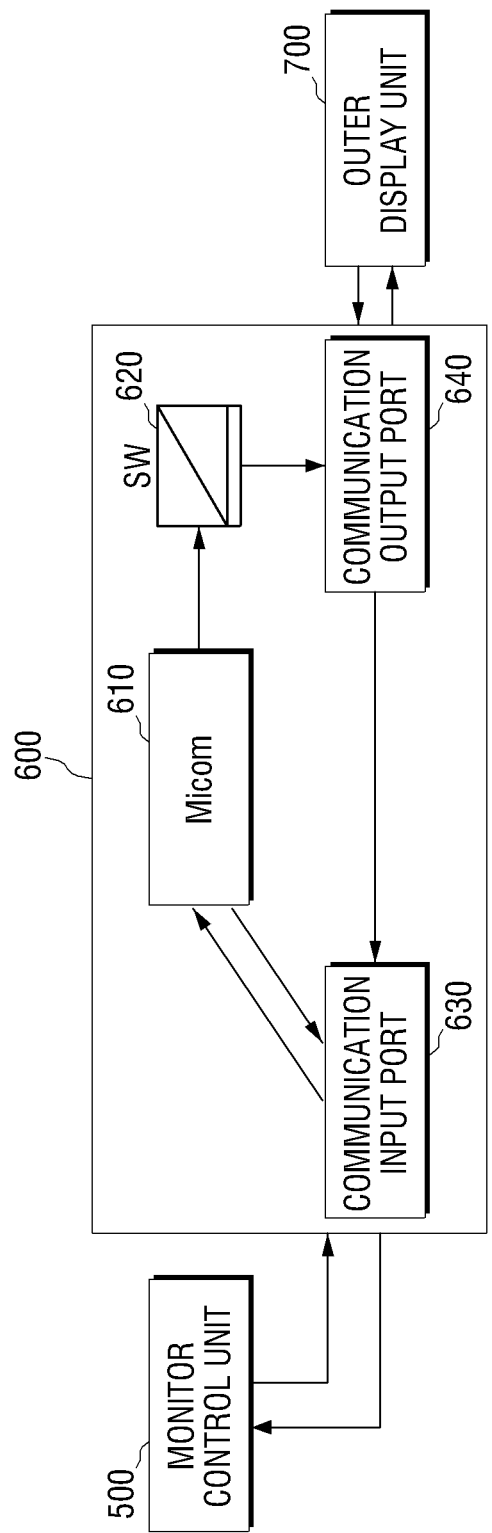
FIG. 5 is a view illustrating a construction of the display unit according to an exemplary embodiment.

FIG. 5 is a view illustrating a construction of the display unit according to an exemplary embodiment.

In the display unit 600 illustrated in FIG. 5, operations of a communication input port 630, a communication output port 640 and a switching part SW 620 are controlled by a control part 610, which is indicated as Micom. Particularly, the control part 610 controls the switching part 620 to determine whether the communication output port 640 and an outer display unit 700 are to be connected to or with each other.

With respect to the connection determination, the control part 610 compares a present ID with an initial ID and determines the connection according to whether the present ID matches the initial ID. That is, a monitor control unit 500 transmits an ID change signal to the communication input port 630 of the display unit 600, and the control part 610 of the display unit 600 changes its own ID, based on the received ID change signal. Thereafter, the control part 610 compares the changed ID with the initial ID and determines whether the changed ID coincides with the initial ID. If the IDs match, the control part 610 may control the switching part 620 to disable a connection between the communication output port 640 and the outer display unit 700. If the IDs do not match, the control part 610 may control the switching part 620 to enable a connection between the communication output port 640 and the outer display unit 700, thus connecting the monitor control unit 500, the display unit 600 and the outer display unit 700 together.

FIG. 5 illustrates a signal flow in a state where the monitor control unit 500, the display unit 600 and the outer display unit 700 are connected.

The signal outputted from the monitor control unit 500 is transmitted to the control part 610 via the communication input port 630, so that the signal may be forwarded to the outer display unit 700 via the communication output port 640. Since the outer display unit 700 has a construction similar to the display unit 600, an input port (not shown) with which the outer display unit 700 is provided will be connected with the communication output port 640 of the display unit 600. This connection may be achieved by radio or wire.

To the contrary, a signal outputted from the outer display unit 700 is transmitted to the communication input port 630 via the communication output port 640, so that the signal may be forwarded to the monitor control unit 500 connected to the communication input port 630. With the signal, the monitor control unit 500 may recognize the outer display unit 700, and may transmit the signal to the outer display unit 700 to control an operation thereof.

Figure 6:
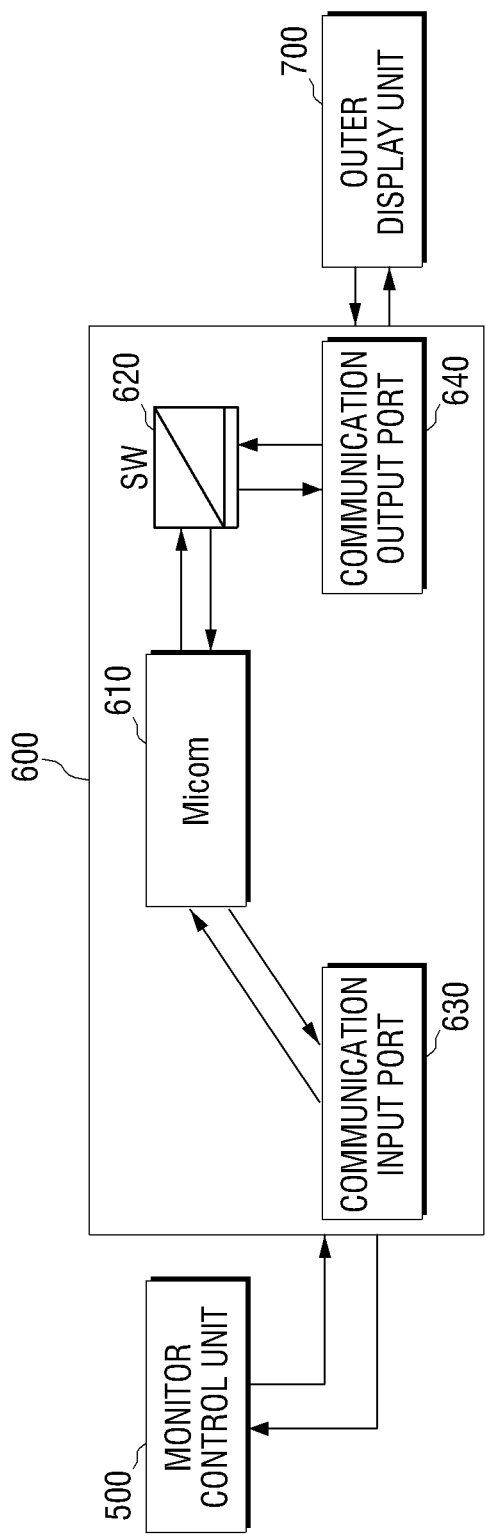
FIG. 6 is a view illustrating a construction of the display unit according to an exemplary embodiment.

FIG. 6 is a view illustrating a construction of the display unit according to an exemplary embodiment. FIG. 6 shows a signal movement different from that of FIG. 5. That is, the communication input port 630 and the communication output port 640 of the display unit 600 are not directly connected with each other, but are connected via the control part 610 and the switching part 620 to enable or disable signal forwarding.

In FIG. 5, to determine whether the communication port 640 is to be connected with display unit 700, the communication port 640 should be controlled. However, in the construction illustrated in FIG. 6, because the communication input port 630 and the communication output port 640 of the display unit 600 are not directly connected to each other, to determine whether the communication port 640 is connected with display unit 700, only the control part 620 may be controlled.

The construction as illustrated in FIG. 5 is suitable for a display unit in which the switching part 620 is software, whereas the construction as illustrated in FIG. 6 is suitable for a display unit in which the switching part 620 is hardware. However, the exemplary embodiments are not limited thereto.

Hereinafter, a general operation of an ID setting system according to an exemplary embodiment will be explained with reference to FIGS. 7A to 7G.

A control unit 800 and a plurality of monitors 900, 910, and 920 are connected to the ID setting system 800 according to the exemplary embodiment. In the description, although the units are assumed and explained as being connected in series, the exemplary embodiment is not limited thereto. For convenience of the explanation, a monitor directly connected to the control unit 800 is referred to as a first monitor 900, a monitor connected to the control unit through the first monitor is referred to as a second monitor 910, and a monitor connected to the control unit through the first and second monitors is referred to as a third monitor 920. Also, it is assumed that the plurality of monitors 900, 910, and 920 have initial IDs set to '0' when manufactured.

Figure 7A:
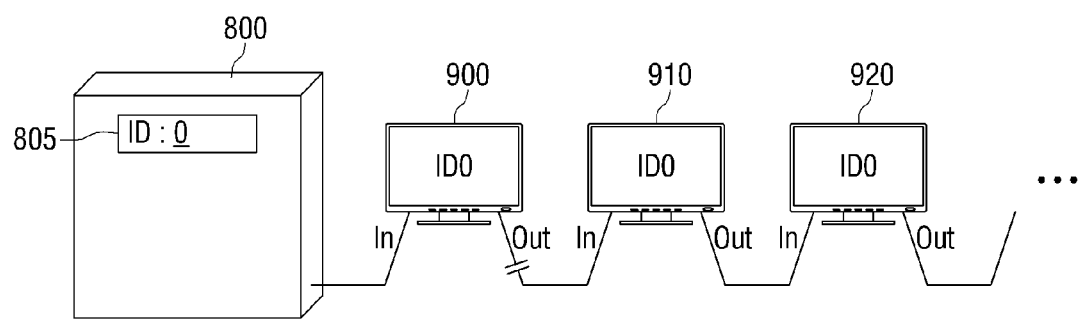
FIGS. 7A to 7G are views illustrating a general operation of an ID setting system according to an exemplary embodiment.

As illustrated in FIG. 7A, at first, the control unit 800 is connected with the first monitors 900. The first monitor 900 compares a present ID with an initial ID. Since the initial ID of the first monitor 900 has not yet been changed, the present ID and the initial ID of the first monitor 900 match. Thus, the first monitor 900 disables a connection to the second monitor 910. In this case, the control unit 800 recognizes only the first monitor 900 and will display 'ID 0' 805 on an ID setting window.

Figure 7B:
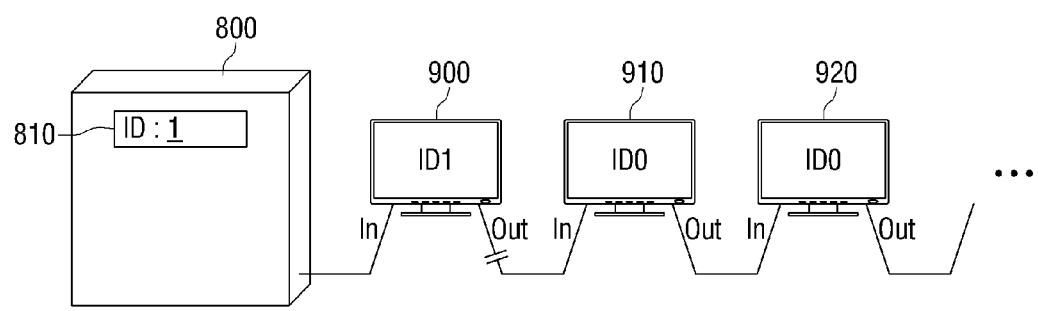

Thereafter, as illustrated in FIG. 7B, to change the ID of the first monitor 900, a user inputs other figure besides '0'. Here, it is assumed that a figure '1' is inputted into an input blank of the ID input window to display 'ID 1' 810 thereon. When the user inputs the figure '1', the ID of the first monitor 900 is changed to '1'.

When the present ID of the first monitor 900 has been changed to '1', which does not coincide with the initial value of '0', the first monitor 900 enables the connection to the second monitor 910.

Figure 7C:
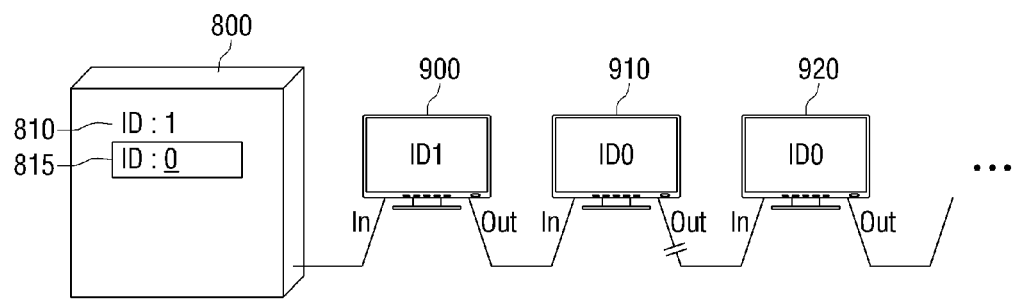

When the first monitor 900 and the second monitor 910 are connected to each other, the control unit 800 recognizes both the first monitor 900 and the second monitor 910, as illustrated in FIG. 7C. That is, both the 'ID 1' 810 of the first monitor 900 and an 'ID 0' 815 of the second monitor 910 will be displayed on the ID setting window.

Since there is a state where the initial ID of the second monitor 910 is not changed, the second monitor 910 will have a present ID, which matches the initial ID. Thus, the second monitor 910 disables a connection to the third monitor 920. Accordingly, the control unit 800 does not recognize the third monitor 920.

Figure 7D:
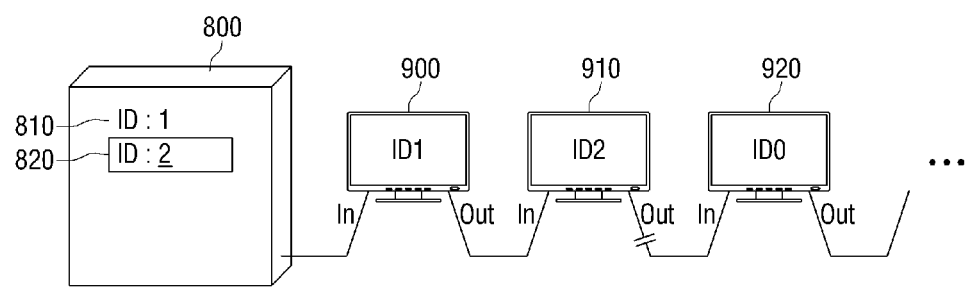

After that, as illustrated in FIG. 7D, the user changes the ID of the second monitor 910 in the ID setting window. Since the ID of the first monitor 900 is already set as '1', the ID of the second monitor 910 will be preferably set to '2', or any other figure. In FIG. 7, it is assumed that the ID of the second monitor 910 is set to '2' to display an 'ID 2' 820 on the ID input window.

According to this, the ID of the second monitor 910 is changed to '2'. With the ID change of the second monitor 910, the present ID of the second monitor 910 is '2', which does not coincide with '0', which is the initial ID. Accordingly, the second monitor 910 enables a connection to the third monitor 920, as illustrated in FIG. 7E.

Figure 7E:
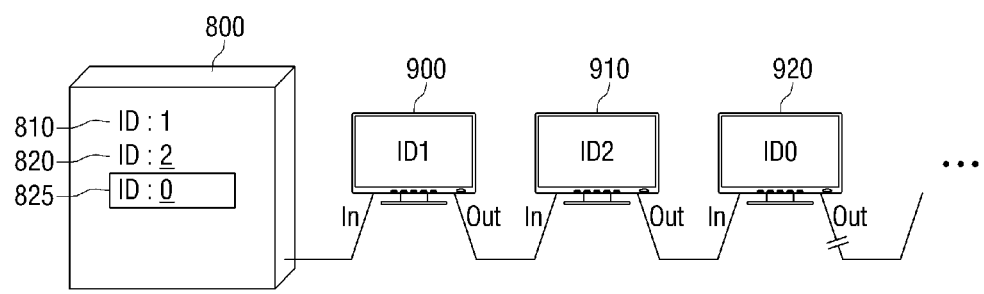

In FIG. 7E, there is a state where the second monitor 910 and the third monitor 920 are connected to each other, the control unit 800 recognizes all of the first monitor 900, the second monitor 910 and the third monitor 920. That is, the ID '1' 810 of the first monitor 900, the ID '2' 820 of the second monitor 910 and an ID '0' 825 of the third monitor 920 will be displayed on the ID setting window of the control unit 800.

Since the initial ID of the third monitor 920 is not changed, the third monitor 920 cuts off a connection to a next monitor (not shown). Accordingly, the control unit 800 cannot recognize the next monitor.

Figure 7F:
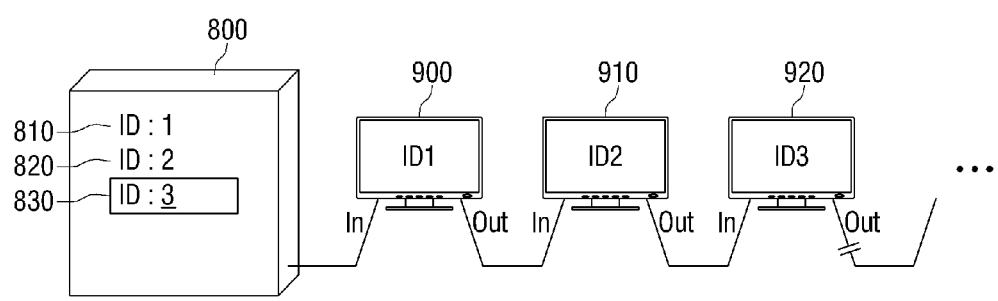

Accordingly, as illustrated in FIG. 7F, the user may change the ID of the third monitor 920 through the ID setting window. If the ID of the third monitor 920 changed to '3' according to a numerical order, an ID '3' 830 is displayed on the ID setting window. Thus, a present ID of the third monitor 920 is changed to '3'. Of course, the ID of the third monitor 920 may be changed to any figure other than the values '0' and '1' respectively assigned to the first monitor 0 and second monitor 1.

Figure 7G:
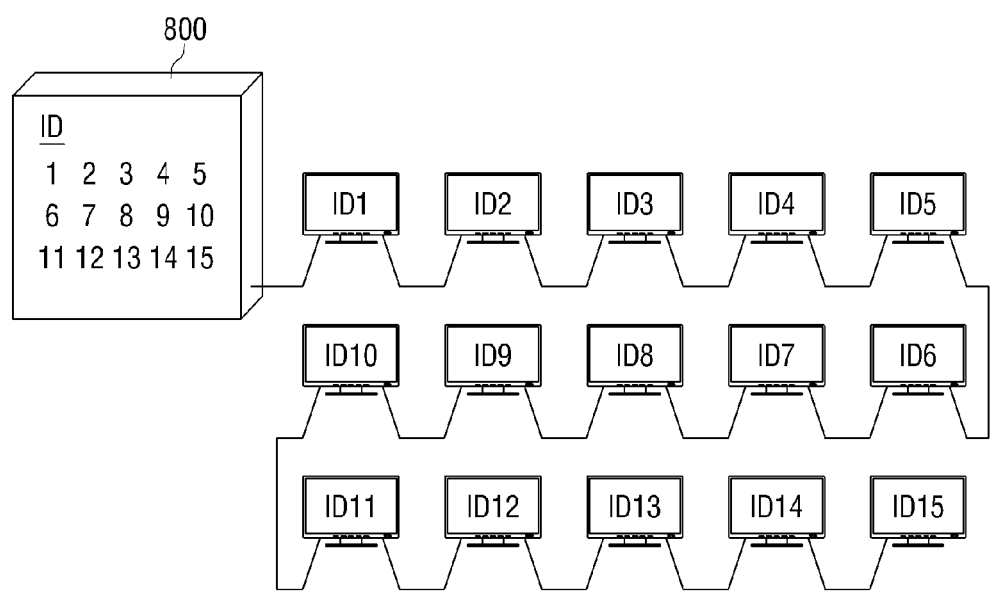

In this manner, the IDs of the plurality of display units may be set. The set IDs are illustrated in FIG. 7G. That is, the control unit 800 can easily set the IDs of the respective monitors. Therefore, even if a large number of monitors are connected together, it is possible to prevent assigning of the same IDs to the respective monitors.

Also, in the description on the exemplary embodiment, although the control unit 800 is explained as a separate unit connected with the first monitor 800, the control unit 800 may be embodied as a remote controller or the like, which is connected by radio with any one of the monitors.

Even if the control unit 800 is a remote controller, since the ID setting of the first monitor 900 disconnects from the other monitors, the control unit 800 can change only an ID of the first monitor 900. Also, the next monitor may be connected only after the ID of the first monitor 900 is changed. Thus, it is possible, not only to prevent a problem in that when one monitor is operated by the remote controller to set an ID thereof, other monitors are also operated to set IDs in response to the control of the remote controller, but also to prevent a problem in that duplicate IDs are set.

Also, in the respective drawings, although the plurality of monitors 900, 910, and 920 are illustrated as being connected by wire to or with one another, the monitors 900, 910, and 920 may be wirelessly connected by radio by means of an IR signal or an RF signal, as described above.

With respect to the above description, although the control unit 800 is explained as being disposed at one endmost side of the plurality of display units, the control unit may be disposed as connected to plural monitors. In addition, although the respective units are explained as forming one series connection, it is possible for the units to form more than one series connections. If embodied in the series connection(s), the connection between the units may be a daisy chain connection, which enables the control unit 800 to communicate the display units, but the exemplary embodiments are not limited thereto and any connection will suffice so long as the connection enables the control unit 800 to communicate the display units.

Also, with respect to the recognition of whether each of the monitors 900, 910, and 920 is connected, the control unit 800 may receive an acknowledge message from each of the monitors to recognize whether each of the monitors is connected by using a unique ID included in the acknowledge message, or receive a message including the initial ID or the present ID, set as described above, to recognize whether each of the monitors is connected. It is obvious to those skilled in the art that the recognition of whether each of the monitors is connected may employ various methods without being limited to any one method.

On the other hand, in the above description, although the setting the IDs of the plurality of monitors is explained while using FIGS. 7A to 7G, the method may employ setting the IDs by initializing the respective IDs of the plurality of monitors into initial IDs or other IDs inputted by the user. At this time, a method in that the plurality of monitors, which is connected by the above described method, is simultaneously initialized may also be performed. Also, a method in that the IDs are initialized in an order from the first monitor 900 connected most close to the control unit 800, or a method in which the IDs are initialized in a reverse order from a display unit connected most apart from the control unit 100 may also be used.

The ID initialization may be performed in such a manner that the control unit 800 generates a control signal for initializing the IDs and transmits the generated control signal to the respective monitors connected to the control unit 800. However, since the control unit 800 and the plurality of monitors are connected by radio or wire, it will be possible to initialize the plurality of monitors in a forward order or a reverse order by using a path different the above method.

According to the exemplary embodiment, it is possible not only to easily set the IDs of the plurality of monitors, but also to conveniently perform the initialization of the connected monitors.

Hereinafter, an ID setting method according to an exemplary embodiment will be explained with reference to FIGS. 8 and 9.

Figure 8:
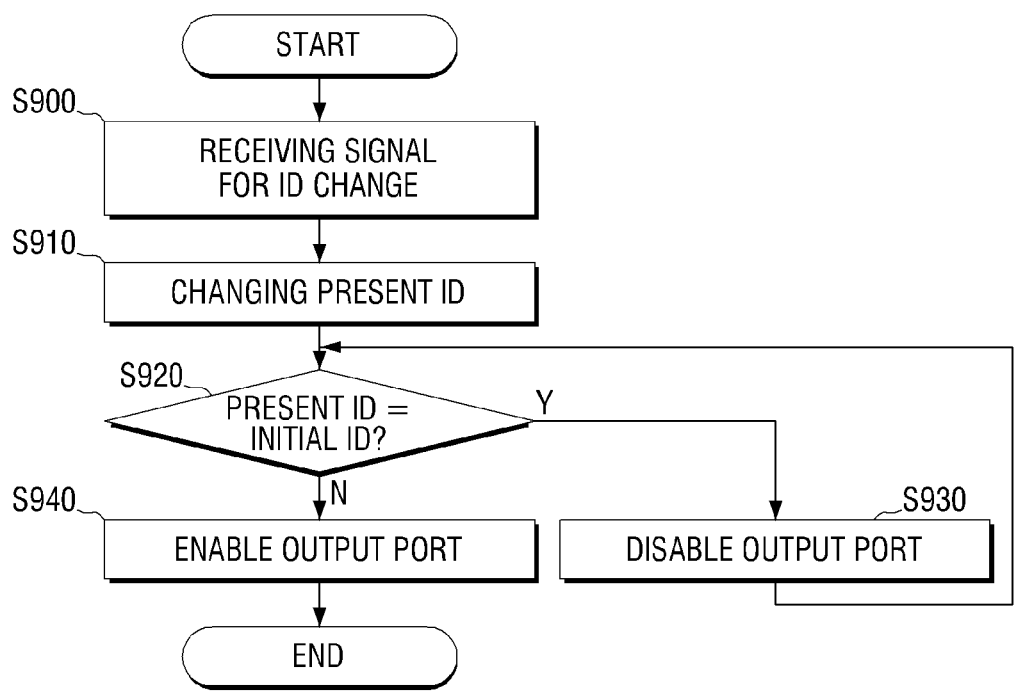
FIG. 8 is a flowchart illustrating an ID setting method according to an exemplary embodiment.

As illustrated in FIG. 8, a signal for ID change is received (S900). An initial ID is changed based on the received signal (S910). The signal may be received from a control unit connected by radio or wire, or a remote controller connected by radio.

A present ID is compared with the initial ID (S920). If the present ID matches the initial ID (S920-Y), a connection of an output port is disabled (S930). Here, since the output port is connected with an outer display unit, disabling the connection of the output port disables signal transmission to and signal reception from the outer display unit.

However, if the present ID does not match the initial ID (S920-N), the output port is connected (S940). At this time, the signal transmission to and signal reception from the outer display unit is enabled.

Figure 9:
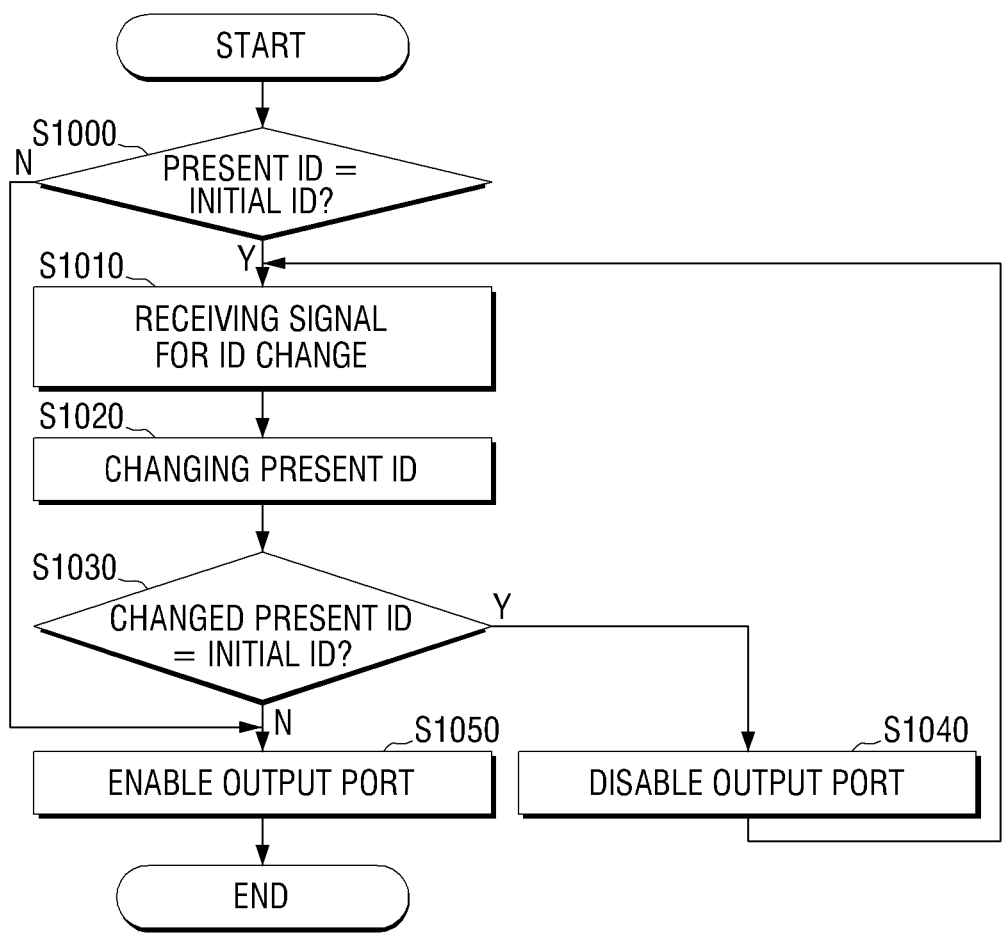
FIG. 9 is a flowchart illustrating an ID setting method according to an exemplary embodiment.

On the other hand, according to an ID setting method in accordance with another exemplary embodiment illustrated in FIG. 9, it is determined whether a present ID matches an initial ID (S1000). If the IDs do not match (S1000-N), an output port for outputting a signal to an outer display unit is connected (S1050).

However, if the present ID matches the initial ID (S1000-Y), a signal for changing an ID is received (S1010), and the present ID is changed based on the received signal (S1020).

The signal for ID change may be received from an outer control unit or a remote controller, as described above.

The changed ID is compared with the initial ID (S1030), and if the IDs do not match (S1030-N), the output port is connected to enable the connection to the outer display unit. However, if the present ID matches the initial ID (S1030-Y), the output port is cut off, and the process reverts to the step of receiving the signal for changing the ID.

With the above method, it is possible to easily set the IDs of the plurality of monitors.

Hereinafter, a construction of a control unit (1100) for setting the IDs in the above ID setting system will be explained in detail with reference to FIGS. 10 and 11.

Figure 10:
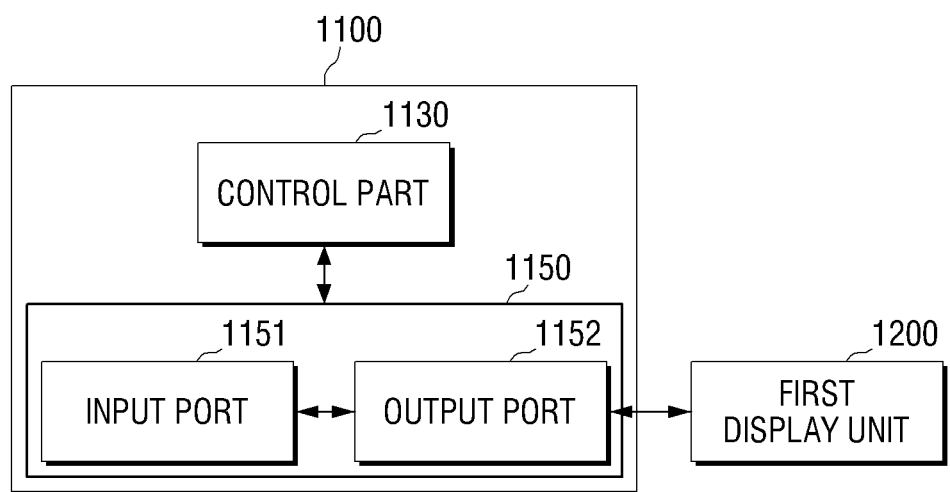
FIG. 10 is a block diagram illustrating a control unit included in the ID setting system according to an exemplary embodiment.

As illustrated in FIG. 10, the control unit 1100 forming one component of the ID setting system according to the exemplary embodiment includes a control part 1130, and a communication part 1150. The communication part 1150 is provided with an input port 1151 and an output port 1152.

The control unit 1100 generates an ID different from IDs set to previously connected display units when a newly connected display unit is identified, and sets the generated ID to the newly connected display unit. More specifically, the control unit 1100 determines an ID of the first display unit 1200 currently connected with the control unit 1100, and generates an ID different from the determined ID to update the ID of the first display unit 1200. Also, if another display unit is newly connected to the first display unit 1200, the control unit generates an ID different from an ID set to the newly connected display unit (not shown) to update the ID of the newly connected display unit.

A connection between the first display unit 1200 and the newly connected display unit is the same as described above. That is, in case of the first display unit 1200, an initial ID and a present ID are compared with each other, and if the IDs match, a communication port is disabled. If the IDs do not match, the communication port is enabled, so that the first display unit 1200 is connected with a subsequent display unit.

Figure 11:
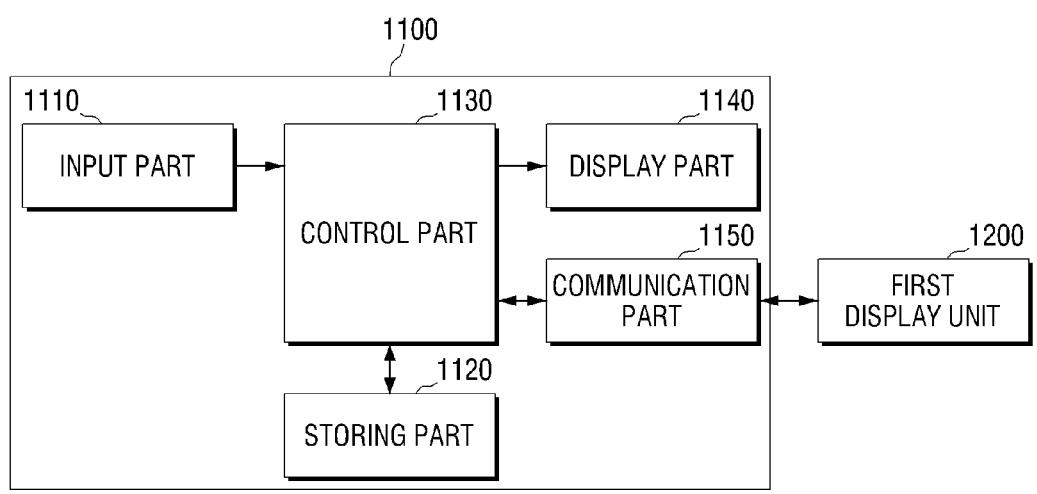
FIG. 11 is a block diagram illustrating a control unit according to an exemplary embodiment.

FIG. 11 is a block diagram illustrating in detail a construction of a control unit 100 forming one component of the ID setting system according to an exemplary embodiment.

In addition to the construction of FIG. 10, the control unit 1100 may further include an input part 1110, a storing part 1120, and a display part 1140.

The input part 1110 receives an input for controlling the control unit 1100. Particularly, if the user manually set IDs for respective display units, it is possible for the user to input the IDs to be set to the respective display units through the input part 1110.

The display part 1140 functions to display all of the IDs of the display units recognized by the control unit 1100, or to display an on screen display (OSD) for ID setting. Through the IDs of display units, which are currently connected and displayed on the displayed part 1140, the user can instinctively judge and operate which display units would be controlled. Also, the user can easily set the IDs of display units based on the OSD.

The storing part 1120 functions to store data needed to control the control unit 1100. Particularly, the storing part 1120 may store the IDs for the respective display units, which are currently recognized, and if automatically setting the IDs, data for judging whether a newly set ID is a previously set ID.

Since functions of the control part 1130 and the communication part 1150 are the same as described with reference to FIG. 10, descriptions thereon will be omitted.

In the description on FIGS. 10 and 11, although the first display unit 1200 is explained as a sole display unit connected with the control unit 1100 as a terminal of the display units connected in series, the exemplary embodiments are not limited thereto. That is, since the control unit 1100 may be connected with plural groups of the display units connected in series as mentioned above, it is not necessary for the display unit connected with the control unit 1100 to be always made up of one display unit, as illustrated in FIGS. 10 and 11.

On the other hand, with respect to the automatic setting of IDs, when the control part 1130 included in the control unit 1100 recognizes that each of the display units is connected, the control part 1130 sets the IDs according to a sequence or randomly sets the IDs while excluding duplicated IDs. Of course, the exemplary embodiments will not be limited thereto, and the IDs may be set in any order such that the IDs are unique.

In recognizing the display units connected to the control unit 1100, there may be a method in that the control unit 1100 receives a signal in which an ID of a connected display unit is included, or if the display unit has the outer unit connected therewith, the display unit transmits an acknowledgement message to the control unit 1100. Since the methods of recognizing when a new unit is connected are known, explanations will be omitted.

With the ID setting system, the ID setting method and the display unit using the same according to the various exemplary embodiments of the present invention as described above, it is possible to obtain the effect to prevent duplicate IDs from being set at the plurality of display units.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An identifier (ID) setting system comprising:
a plurality of display units, each identified by a respective pre-stored initial ID, that adjust a connecting state between each other according to whether a present ID matches a pre-stored initial ID, respectively;
a control unit that sets IDs of currently connected display units by transmitting an ID which is different from an ID of another display unit, when the currently connected display units connect with the another display unit; and
wherein each of the plurality of display units comprises:
an input port;
a memory that stores the present ID and the pre-stored initial ID;
an output port; and
a control part that compares the present ID and the pre-stored initial ID with each other and enables a connection between the output port and an input port of another display unit when the present ID and the pre-stored initial ID do not match and disables the connection between when the present ID and the pre-stored initial ID match,
wherein, when the connection is disabled, the display unit is assigned an ID transmitted by the control unit which is different from the ID of another display unit, the pre-stored initial ID of the respective display, and the present ID which matched the pre-stored initial ID.

2. The ID setting system of claim 1, wherein the control unit is connected in series with a display unit disposed at a terminal of the plurality of display units.

3. The ID setting system of claim 2, wherein when a newly connected display unit is connected, the control unit generates an ID different from the IDs of previously connected display units and assigns the generated ID to the newly connected display unit.

4. The ID setting system of claim 1, wherein the control unit comprises:
an output port connected in series with one of the plurality of display units; and a control part that generates an ID different from a pre-stored initial ID of the one display unit and assigns the generated ID as a present ID of the one display unit, wherein the control part assigns an ID different from the present ID of the one display units as a present ID to at least one subsequent display unit subsequently connected to the one display unit.

5. The ID setting system of claim 1, wherein the control unit comprises:
an output port connected in series with one of the plurality of display units;
a control part that generates an ID different from a pre-stored initial ID of the one display unit;
a display part that displays the generated ID; and
an input part that receives a user select signal for selecting the displayed ID,
wherein when the user select signal is received, the control part assigns the generated ID as a present ID of the one display unit and successively generates an ID different from the present ID of the one display unit to at least one subsequent display unit subsequently connected to the one display unit.

6. An identifier (ID) setting method of an ID setting system that includes a plurality of display units, each containing a respective pre-stored initial ID, and a control unit, the ID setting method comprising:
comparing a present ID with the pre-stored initial ID of a first display unit, by a control part of the first display unit among the plurality of display units;
by the control part of the first display unit, enabling a connection between an output of the first display unit and an input port of a second display unit among the plurality of display units when the present ID and the pre-stored initial ID do not match each other, and disabling, by the control part of the first display unit, the connection between the output port of the first display unit and the input port of the second display unit when the present ID and the pre-stored initial ID match each other;
by the control unit, generating an ID different from the pre-stored initial ID and assigning the generated ID as a present ID of the first display unit when the connection between the first display unit and the second display unit is disabled; and
by the control unit, setting IDs of currently connected display units by transmitting an ID which is different from an ID of another display unit, when the currently connected display units connect with the another display unit,
wherein the present ID and the pre-stored initial ID are stored in the first display unit.

7. The ID setting method of claim 6, further comprising:
generating an ID different from the present ID of at least one of the first display unit and the second display unit;
displaying the generated ID;
receiving a user select signal for selecting the displayed ID; and
assigning the generated ID as a present ID of at least one of the first display unit and the second display unit when the user select signal is inputted.

8. The ID setting method of claim 6, further comprising repeating the comparing, the switching, and the setting for each of the plurality of display units other than the first display unit and the second display unit.

9. A display unit comprising:
an input port that receives a signal;
an output port that outputs the received signal to an input port of another display unit;
a memory that stores a present identifier (ID) and a pre-stored initial ID; and
a control part that compares the present ID and the pre-stored initial ID with each other,
wherein the control part disables a connection between the output port and the input port of the another display unit when the present ID and the pre-stored initial ID match each other and enables a connection between the output port and the input port of the another display unit when the present ID and the pre-stored initial ID do not match each other,
wherein, when the connection is disabled, the control part receives an ID generated and assigned to the display unit by an external control unit, and
wherein the assigned ID is different from the ID of another display unit, the pre-stored initial ID of the respective display, and the present ID which matched the pre-stored initial ID.

10. The display unit of claim 9, further comprising:
a switching part that selects whether the output port and the input port of another display unit are connected with each other,
wherein the control part controls the switching part to determine whether the output port and the input port of the another display unit are connected with each other.

11. The display unit of claim 9, wherein the present ID is changed into a value different than a value of the pre-stored initial ID by a control signal outputted from the control part.

12. The display unit of claim 9, wherein the output port outputs a control signal received from the input port, to the external unit.

13. An identifier (ID) setting method, comprising:
receiving an ID change signal, for setting a present ID, from a control unit which transmits the ID change signal according to a state of a connection between an output port of a display unit and an input port of another display unit;
comparing the present ID set by the received ID change signal with a pre-stored initial ID; and
disabling the connection between the output port of the display unit and the input port of the another display unit when the present ID and the pre-stored initial ID match each other and enabling the connection between the output port of the display unit and the input port of the another display unit when the present ID and the pre-stored initial ID do not match with each other,
wherein, when the connection is disabled, a control part receives an ID generated and assigned to the display unit by an external control unit,
wherein the assigned ID is different from the ID of another display unit, the pre-stored initial ID of the respective display, and the present ID which matched the pre-stored initial ID, and
wherein the present ID and the pre-stored initial ID are stored in the display unit.

14. The ID setting method of claim 13, wherein the control unit controls setting of the present ID of the display unit.

15. The ID setting method of claim 13, wherein the output port is connected with the outer external by radio or by wire.

16. The ID setting method of claim 13, wherein the output port is a port through which a received signal is output to the external unit.

17. A display unit comprising:
a memory that stores an identifier (ID) that identifies the display unit and a predetermined value;
an input port that receives an ID change signal, for setting the ID, from a control unit;
an output port that connects the display unit to an input port of a second display unit; and
a controller that determines whether a value of the ID matches the predetermined value by comparing the value of the ID and the predetermined value and controls the output port to connect to the input port of the second display unit in response to determining that the value of the ID does not match the predetermined value and controls the output port to disconnect from the input port of the second display unit in response to determining that the value of the ID does not match the predetermined value,
wherein the control unit transmits the ID change signal according to a connection state between the output port and the input port of the second display unit, and
wherein, when the connection state is disconnected, the display unit is assigned an ID transmitted by the control unit which is different from the ID of another display unit, the predetermined value, and the value of the ID which matched the predetermined value.

18. The display unit of claim 17, wherein the predetermined value is a value assigned by a manufacturer of the display at a time of manufacturing the display.

* * * * *